United States Patent [19]

Steele et al.

[11] Patent Number: 4,800,259
[45] Date of Patent: Jan. 24, 1989

[54] DOCUMENT TRACK WORK STATION

[75] Inventors: David Steele, Edinburgh; Robert G. Bradford, Bonnybridge, both of Scotland

[73] Assignee: Unisys Corporation, Blue Bell, Pa.

[21] Appl. No.: 906,065

[22] Filed: Sep. 11, 1986

[30] Foreign Application Priority Data

Sep. 14, 1985 [GB] United Kingdom ............... 8522788

[51] Int. Cl.⁴ .................................... G06K 13/06
[52] U.S. Cl. ................................ 235/483; 400/247
[58] Field of Search ............. 235/449, 380, 485, 486, 235/484, 454, 440, 466, 483; 101/35, 44, 137, 175, 234, 242; 400/247, 248, 713

[56] References Cited

U.S. PATENT DOCUMENTS

| 3,983,366 | 9/1976 | Gunn | 235/454 X |
| 4,031,359 | 6/1977 | Christan et al. | 235/485 X |
| 4,151,564 | 4/1979 | Schreiber et al. | 235/466 X |
| 4,317,029 | 2/1982 | Warthan | 235/483 X |
| 4,395,144 | 7/1983 | Adams et al. | 101/35 X |
| 4,444,519 | 4/1984 | Howell et al. | 101/93.04 X |
| 4,463,251 | 7/1984 | Koutonen et al. | 235/454 X |
| 4,613,241 | 9/1986 | Kitagawa | 101/93.05 X |

FOREIGN PATENT DOCUMENTS 1431742  4/1976  United Kingdom .

Primary Examiner—M. H. Paschall
Assistant Examiner—A. Jonathan Wysocki
Attorney, Agent, or Firm—Mark T. Starr

[57] ABSTRACT

A document track for use in a check encoding machine or typewriter comprises a workhead positioned in a slot in a wall of the track, the slot being positioned transverse to the direction of movement of a document in the track, the slot closed off by a flexible strip held flush with the inner surface of the wall by means of first and second support brackets and first and second support arms. As the workhead moves up and down the slot, the flexible strip passes around the workhead such that only a working surface of the workhead is exposed in the slot, the rest of the slot being screened off flush with the inner surface of the wall by the flexible strip.

22 Claims, 3 Drawing Sheets

DOCUMENT TRACK WORK STATION

BACKGROUND OF THE INVENTION

The present invention relates to a work station in a document track. More particularly, the present invention relates to such a work station where a workhead is presented through the wall of the document track at a selectable height in the track to interact with a selectable position on a document passing along the track. Most particularly, the present invention relates to such a work station where the leading edge of the document is prevented from fouling any part of the work station.

Document tracks are variously used in document processing or printing apparatus for leading documents through the apparatus to interact with work stations. For example, in check encoding equipment checks are moved from an input bin along one or more document tracks and, after processing, are deposited in selected output bins. In passing along the tracks, the documents or checks are subjected to various operations at work stations. At some work stations, data will be read from the check. At other work stations, data will be printed upon the check. At yet other work stations, an image of the check may be captured for later use.

In order to obtain maximum versatility from such a check coding apparatus, it is necessary to allow the apparatus to process as many different kinds and sizes of checks from as many different banks as possible. To this end, it thus becomes necessary to be able to adjust the height of interaction of the various workheads in the various work stations to accomodate the type of check actually being processed.

The workhead is presented through a slot substantially transverse to the direction of movement of the document or check along the track such that its working surface lies flush with (that is, substantially parallel to and level with) the inner surface of a wall in a document track. The height of the workhead is adjusted to read or print upon selected tracks on the check as it passes by.

While the working surface of the workhead is maintained flush with the inner surface of the track wall, the slot itself in which the workhead is positioned presents an obstacle wherein the leading edge of the check or document can catch causing a jam which requires cessation of operation of the check encoder, a clearance of the jam and later manual recovery and processing of the check or document which caused the jam.

It therefore becomes desirable to provide a work station wherein jamming of the leading edge of a document is prevented.

SUMMARY OF THE INVENTION

According to the present invention, there is provided an apparatus for presenting a working surface of a workhead through a slot in a document track wall to lie flush with an inner surface of the document track wall, the slot being transverse to the track and the workhead being selectably positionable along the slot to interact with a selectable position on a surface of a document in the track. The apparatus includes a flexible strip supported flush with the track's inner surface. The strip includes a first portion closing-off a first portion of the slot on a first side of the working surface and a second portion closing-off a second portion of the slot on a second side of the working surface. The workhead includes a flexible strip path operative to displace the first portion of the strip through the slot proximate to the first side of the working surface and operative to displace the second portion of the strip through the slot proximate to the second side of the working surface. The first portion of the strip is operative to move into the path and the second portion of the strip is operative to move out of the path when the workhead is moved towards the first side. The first portion of the strip is operative to move out of the path and the second portion of the strip is operative to move into the path when the workhead is moved towards the second side.

The present invention is hereinafter described for use in a document track in equipment such as a check encoder. It is to be appreciated that this is simply one exemplary use of the present invention which may equally be employed in any apparatus wherein a workhead is required to move transversely to the path of a document.

The term "transverse to" is hereinbefore and hereinafter defined as "having a component of direction at 90° to".

In a preferred embodiment, a document track in a check encoding maching comprises a workhead having an optical character reader selectably positionable in a slot transverse to the direction of movement of the check to scan selectable tracks along the check depending upon which track is to be read and what kind of check is being processed.

In the preferred embodiment of the present invention, a shutter is provided in the form of a flexible strip forming a first screen in that portion of the slot above the workhead and a second screen in that portion of the slot below the workhead by being maintained flush with the inner surface of the wall of the document track wherein the slot if provided and filling the slot. In the preferred embodiment, the flexible strip passes around the workhead in a flexible strip path and the workhead includes first and second support arms for maintaining those portions of the flexible strip respectively forming said first and second screens flush with the inner surface of the document track wall.

In the preferred embodiment, the workhead is positioned using a lead screw which is manually rotatable to raise and lower the workhead. Also in the preferred embodiment, the workhead is maintained with a working surface flush with the inner surface of the document track wall by means of a through-passing support pillar.

As the lead screw is rotated and the workhead is raised or lowered, so the flexible strip slides around the workhead in the flexible strip path such that the first and second screens serve always to close off the slot and provide a substantially smooth and continuous surface for any document passing along the track.

DESCRIPTION OF THE DRAWINGS

The present invention is further explained, by way of an example, by the following description read in conjunction with the appended drawings in which.

DESCRIPTION OF THE INVENTION

Figure 1:
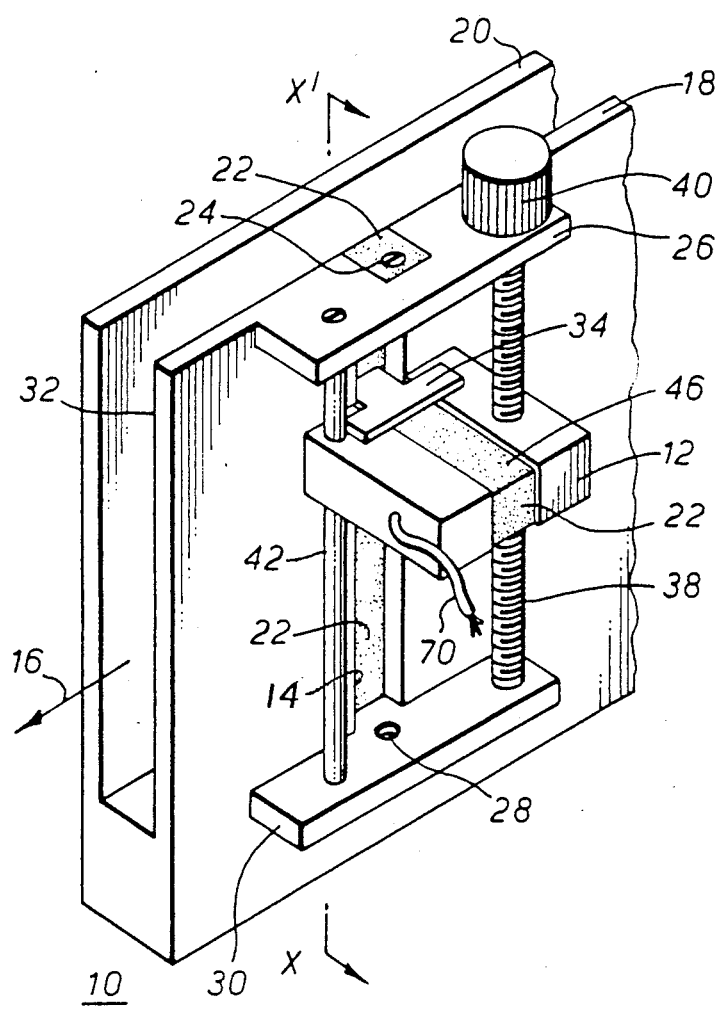
FIG. 1 shows an isometric projected view of a document track incorporating the present invention.

FIG. 1 shows a document track 10 wherein a workhead 12 is positioned in a slot 14 lying transverse to the direction of a document (not shown) in the track 10 indicated by the arrow 16. The document track 10 is of any type well known in the art and comprises first 18 and second 20 track walls. The slot 14 is provided in the first track wall 18. The second track wall 20 and/or the first track wall 18 may incorporate means for driving the document or check along the track 10 in any way known in the art.

While the slot 14 is here shown as being at 90° to the direction 16 of a check or document along the track 10, it is to be appreciated that the present invention will also function where the slot 14 lies diagonally to the track 10.

A flexible strip 22 has a first end held by a first fixing 24 such as a screw or stud on a first support bracket 26 at a first extremity of the slot 14. The flexible strip 22 has a second end attached by a second fixing 28 to a second support bracket 30 at a second extremity of the slot 14.

The first support bracket 26 supports the flexible strip 22 flush with the inner surface 32 of the first track wall 18 and the workhead 12 comprises a first support arm 34 on the side thereof proximate to the first support bracket 26 which serves to support that portion of the flexible strip 22 between the workhead 12 and the first bracket 26 flush with the inner surface 32 of the first track wall 18. Not shown in FIG. 1 is a second support arm 36 on that side of the workhead 12 proximate to the second support bracket 30 and also serving to support the flexible strip 22 flush with the inner surface 32 of the first track wall 18. The width of the flexible strip 22 is made substantially equal to the width of the slot 14 for the flexible strip 22 to fill the slot 14.

A lead screw 38 is supported between the first support bracket 26 and the second support bracket 30 and passes through the body of the workhead 12. A manually turnable knob 40 rotates the lead screw 38 to position the workhead 12 at a selectable point along the slot 14. A support pillar 42 also passes through the body of the workhead 12 to prevent rotation of the workhead 12 as the lead screw 38 is turned and to support a working surface 44 (not shown in FIG. 1, but shown in FIGS. 2 & 3) of the workhead 12 flush with the inner surface 32 of the first track wall 18.

The first support arm 34 and the second support arm 36 (shown in FIG. 2) co-operate to duct the flexible strip 22 into and around a flexible strip path 46 slightly recessed into the body of the workhead 12.

As the lead screw 38 rotates, so the workhead 12 is raised and lowered to a selectable position along the slot 14. That portion of the flexible strip 22 in the flexible strip path 46 moves around the workhead 12 as the workhead 12 moves in the slot 14.

Figure 2:
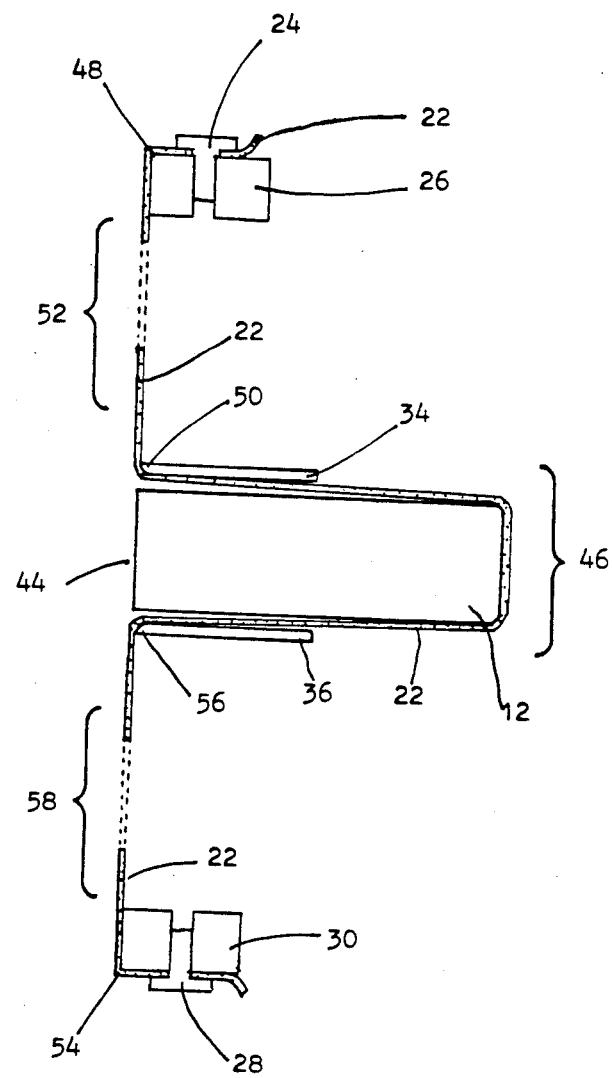
FIG. 2 shows a cross-sectional view of the workhead and flexible strip cut along the line X-X' of FIG. 1 in the plane of the arrows.

FIG. 2 more clearly shows the manner of co-operation between the workhead 12 and the flexible strip 22.

The leading edge 48 of the support bracket 26 supports the flexible strip 22 flush with the inner surface 32 of the first track wall 18. The leading edge 50 of the first support arm 34 similarly supports the flexible strip 22 flush with the inner surface 32 of the first track wall 18. That portion of the flexible strip 22 between the leading edge 48 of the first support bracket 26 and the leading edge 50 of the first support arm 34 forms a first screen 52 closing off that portion of the slot 14 between the workhead 12 and the first support bracket 26.

The leading edge 54 of the second support bracket 30 supports the flexible strip flush with the inner surface 32 of the first track wall 18. The leading edge 56 of the second support arm 36 similarly supports the flexible strip 22 flush with the inner surface 32 of the first track wall 18. The portion of the flexible strip 22 between the leading edge 54 of the second support bracket 30 and the leading edge 56 of the second support arm 36 thus forms a second screen 58 operative to close off the slot 14 in that portion thereof lying between the workhead 12 and the second support bracket 30.

The first support arm 34 and second support arm 36 co-operate with the flexible strip path 46 such that, as the workhead 12 is moved, so the flexible strip 22 in the first screen 52 and the second screen 58 slides around the flexible strip path 46 allowing the workhead 12 to assume a new position in the slot with the first screen 52 and the second screen 58 still entirely closing that portion of the slot 14 not occupied by the working surface 44 of the workhead 12.

For example, if the workhead 12 were to rise as shown in FIG. 2, a portion of the flexible strip 22 in the first screen 52 would pass onto the workhead 12 along the flexible strip path 46 under guidance from the first support arm 34 and some of the flexible strip 22 already in the flexible strip path 46 would pass under guidance from the second support arm 36 to form a new portion of the second screen 58.

The flexible strip 22, the first 26 and second 30 support brackets and first 34 and second 36 support arms co-operate to provide a shutter having first 52 and second 58 screens operative to close off the slot 14 regardless of the position of the workhead 12 in the slot.

Figure 3:
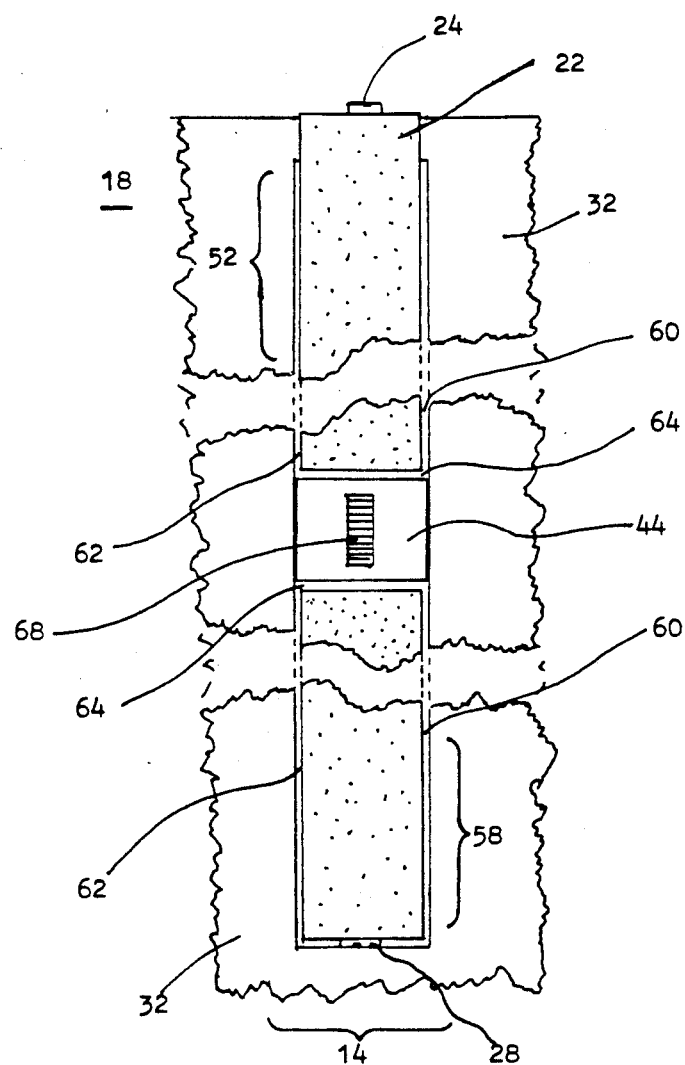
FIG. 3 shows a view of the closed-off slot of FIG. 1 looking on the inner surface of the document track wall in the direction indicated by the arrows on the line X-X'.

FIG. 3 shows a view of the slot 14 looking towards the inner surface 32 of the first track wall 18 in the direction indicated by the arrows on the line X-X' of FIG. 1.

The slot 14 is entirely filled except for a very small first gap 60 and second gap 62 on either side of the flexible strip 22 and except for a very small third gap 64 and fourth gap 66 lying above and below the working surface 44 where the first 34 and second 36 support arms respectively duct the flexible strip 22 around the workhead 12. These gaps may be made as small as is desired by appropriate selection of dimensions of the width of the slot 14 and the width of the flexible strip 22. At one extreme of design, the third gap 64 and the fourth gap 66 may be reduced to nothing if the first 34 and second 36 support arms are caused to urge the flexible strip 22 against respective edges of the working surface 44.

In FIG. 3, the working surface 44 of the workhead 12 is shown as comprising an optical scanner array 68 for reading characters from a passing check or document. This use of the workhead 12 is exemplary and the workhead 12 may be used for almost any purpose in document processing. For example, the workhead 12 may comprise a dot matrix printer or impact printer or may comprise a magnetic character reader or block printing apparatus. Similarly, the workhead 12 may incorporate a daisy-wheel printer or a more sophisticated optical scanner designed to capture a real-time image of a portion of the check or document as it passes by.

Returning to FIG. 1, it is to be appreciated that the lead screw 38 may be turned by an electric motor rather than by a knob 40 for the positioning of the workhead 12 to be achieved automatically without manual intervention. The workhead 12 may equally well be positioned using stepper motors and belt drives rather than the lead screw 38.

The present invention is particularly applicable to typewriting and computer controlled apparatuses where the workhead 12 comprises a printer moved across a document to be printed. The flexible strip 22 may thus be employed to close off a possible hazzard in the paper path of a typewriter or similar printing apparatus in a manner hitherto unknown to the art, the flexibility of the strip 22 allowing the workhead 12 in this instance to move to and fro along its line of printing while maintaining a substantially smooth and flush inner surface of the track wall (in this instance proximate to a platen or other printing support) to the leading edge of any document.

Again referring to FIG. 1, the workhead 12 includes an electrical connection 70 leading to the working surface 44 of the workhead 12 which passes beneath that portion of the flexible strip 22 in the flexible strip path 46 passing there-around. The present invention thereby permits ready electrical connection to a workhead 12 by virtue of the first and second screens 52, 58 automatically adjusting without fouling of any electrical cable 70 connected to the workhead 12.

While the flexible strip 22 has hereinbefore been shown as passing right around the workhead 12 in a flexible strip path 46, it is to be appreciated that a separate recessed path 46 is not a necessary feature of the present invention and the flexible strip 22 may pass around the workhead 12 without use of a separate path 46. Yet further, it is not necessary for the flexible strip 22 to pass right around the outside of the workhead 12. All that is necessary is that a portion of the flexible strip 22 be displaced away from the inner surface 32 of the first track wall 18 to allow access to the track by the working surface 44 of the workhead 12. To this end, the flexible strip 22 having been deflected away from the inner surface 22 may be passed through the workhead 12 in a slot rather than by passage around the outside of the workhead 12.

With reference again to FIG. 2, the leading edge 50 of the first support arm 34 and the leading edge 56 of the second support arm 36 are here shown as having a slightly rounded surface allowing the flexible strip 22 to slide without opposition thereagainst. It is to be appreciated that the leading edges 50, 56 of the first and second support arms 34, 36 may include rollers for low-friction ducting of the flexible strip 22 and that the flexible strip path 46, where provided, may also comprise rollers for the support of the flexible strip 22.

The flexible strip 22 may be made of any flexible strip material capable of sustaining a slight tension to remain taught in the slot 14 and capable of being flexibly ducted around or through the workhead 12. In the preferred embodiment of the present invention, the material used is a polyester. It is to be appreciated that those skilled in the art may employ the present invention adapting many fabric and polymer based sheet materials for use as the flexible strip 22.

While the strip 22 and slot 14 have hereinbefore been shown and described as having substantially parallel sides, the present invention may function equally well in a slot having shaped, tapered or sloping sides and employing a similarly shaped, tapered or sloping flexible strip 22.

It is to be appreciated that the apparatus hereinbefore described can function as the terminal portion of a document track in which case it is not required that the slot comprises two edges, the shutter providing the trailing terminal edge of the document track. Accordingly a slot is hereinbefore and hereinafter defined as a void in a track wall either in a central portion of the wall or representing a terminal portion of the wall and having at least one edge.

We claim:

1. An apparatus which selectively positions a workhead along a slot in a document track wall, comprising:
    positioning means, coupled to said workhead, for moving said workhead along said slot;
    a flexible strip coupled to said wall; and
    strip displacing means, coupled to said workhead and responsive to movement of said workhead along said slot, and for displacing said flexible strip to occupy a portion of said slot unoccupied by said workhead.

2. The apparatus according to claim 1 wherein said workhead includes a working surface on a first end of said workhead, said working surface positioned in said slot.

3. The apparatus according to claim 2 wherein said strip displacing means includes strip path means for guiding said flexible strip from a position in said slot directly adjacent a first extremity of said working surface around a second end of said workhead opposite said first end and continuing back to a position in said slot directly adjacent a second extremity of said working surface.

4. The apparatus according to claim 3 wherein said workhead includes a top and a bottom positioned between the first and second ends of said workhead, said strip displacing means including a channel in the surface of said workhead extending across the top, second end and bottom of said workhead, said strip positioned in said channel.

5. The apparatus according to claim 4 wherein said strip displacing means further includes:
    a first support arm on said top of said workhead across said channel, said first support arm extending into said slot and providing a first surface on which said strip is supported; and
    a second support arm on said bottom of said workhead across said channel, said second support arm extending into said slot and providing a second surface on which said strip is supported.

6. The apparatus according to claim 5 wherein said strip displacing means further includes:
    a first support bracket positioned at a first end of said slot, said first support bracket supporting a first end of said flexible strip; and
    a second support bracket positioned at a second end of said slot, said second support bracket supporting a second end of said flexible strip.

7. The apparatus according to claim 6 wherein:
    said slot is transverse to said document track;
    said slot has parallel sides; and
    said flexible strip has the same width as said slot.

8. The apparatus according to claim 7 wherein said strip displacing means inludes means for supporting said flexible strip flush with the inner surface of said document track wall.

9. The apparatus according to claim 5 wherein said positioning means includes a threaded lead screw coupled to said document track wall, said lead screw passing through and threadably engaged with said workhead, whereby rotation of said lead screw causes said workhead to be moved along said slot.

10. An apparatus comprising:
a document track, a slot provided in a wall of said document track;
a workhead positioned along said slot, said workhead occupying a first portion of said slot along the length of said slot;
a flexible strip positioned along said slot and occupying a second portion of said slot along the length of said slot, said second portion of said slot excluding said first portion of said slot.

11. The apparatus according to claim 10 wherein said workhead includes a working surface, said workhead positioned such that said working surface lies flush with an inner surface of said wall, said flexible strip positioned with a surface flush with said inner surface of said wall.

12. The apparatus according to claim 11 wherein said first and second portions are directly adjacent to one another.

13. An apparatus which presents a working surface of a workhead through a slot in a document track wall to lie flush with an inner surface of said wall, said slot being transverse to said track and said workhead being selectively positionable along said slot to interact with a selectable position on a surface of a document in said track, said apparatus comprising: a flexible strip supported flush with said inner surface; said strip including a first portion closing-off a first portion of said slot on a first side of said working surface and a second portion closing-off a second portion of said slot on a second side of said working surface; said workhead including flexible strip path means for displacing said first portion of said strip through said slot proximate to said first side of said working surface and for displacing said second portion of said strip through said slot proximate to said second side of said working surface; said strip path means further for moving said first portion of said strip into said path and said second portion of said strip out of said path when said workhead is moved towards said first side; said strip path means still further for moving said first portion of said strip out of said path and said second portion of said strip into said path when said workhead is moved towards said second side.

14. An apparatus according to claim 13 wherein said flexible strip, displaced through said slot, passes around said workhead.

15. An apparatus according to claim 14 wherein said strip path means includes a first support arm on said first side of said working surface operative to support said first portion of said strip flush with said inner surface and a second support arm on said second side of said working surface operative to support said second portion of said strip flush with said inner surface.

16. An apparatus according to claim 15 including a first support bracket at a first extreme end of said slot supportive of a first end of said flexible strip and a second support bracket at a second extreme end of said slot supportive of a second end of said flexible strip.

17. An apparatus according to claim 16 wherein said slot has parallel sides and wherein said flexible strip has the same width as said slot.

18. An apparatus according to claim 16 wherein said workhead includes an electrical connection; said flexible strip, displaced through said slot, passing around said workhead.

19. An apparatus according to claim 16 wherein said working surface includes an optical character reader.

20. An apparatus according to claim 13 including a positioner for selectively positioning said workhead along said slot.

21. An apparatus according to claim 20 wherein said positioner includes a selectably rotatable lead screw.

22. An apparatus according to claim 16 including a positioner for selectively positioning said workhead along said slot.

* * * * *